United States Patent [19]
Boutet et al.

[11] Patent Number: 6,073,247
[45] Date of Patent: Jun. 6, 2000

[54] PROCESS FOR SYNCHRONIZING A COMPUTER SYSTEM AND COMPUTER SYSTEM THUS SYNCHRONIZED

[75] Inventors: Michèle Boutet, Echirolles; Nasr-Eddine Walehiane, Eybens, both of France

[73] Assignee: BULL, S.A., Louveciennes, France

[21] Appl. No.: 09/148,142

[22] Filed: Sep. 4, 1998

[30] Foreign Application Priority Data

Sep. 4, 1997 [FR] France ................................ 97 11026

[51] Int. Cl.⁷ ............................................ G06F 1/04
[52] U.S. Cl. ........................................ 713/500; 713/600
[58] Field of Search .................................. 713/323, 400, 713/401, 500, 501, 502, 503, 600, 601; 712/31, 1; 709/208, 209, 211; 710/61, 261, 267; 714/12; 364/132; 375/360; 370/451; 331/1 A

[56] References Cited

U.S. PATENT DOCUMENTS

| | | | |
|---|---|---|---|
| 4,890,222 | 12/1989 | Kirk . | |
| 5,305,453 | 4/1994 | Boudry et al. | 713/400 |
| 5,404,565 | 4/1995 | Gould et al. | 712/1 |
| 5,537,549 | 7/1996 | Gee et al. | 709/200 |
| 5,592,125 | 1/1997 | Williams | 331/1 A |
| 5,640,523 | 6/1997 | Williams | 375/360 |
| 5,684,803 | 11/1997 | Nguyen Thuy | 370/451 |
| 5,729,721 | 3/1998 | Bettelheim et al. . | |
| 5,777,870 | 7/1998 | Takaku | 364/132 |

FOREIGN PATENT DOCUMENTS 9515529 8/1995 WIPO .

OTHER PUBLICATIONS

"Synchronizing Time–Of–Day Clocks in Coupled Computer System", IBM Technical Disclosure Bulletin, vol. 36, No. 8, Aug. 1, 1993, pp. 617–619, XP000390352.

"Primary Clock Synchronization Facility" Research Disclosure, No. 330, Oct. 1, 1991, p. 768,XP000265018.

Riccardo Gusella and Stefano Zatti, "An Election Algorithm for a Distributed Clock Synchronization Program", The 6th International Conference on Distributed Computing Systems, IEEE Computer Society, 19–23 May 1986, Cambridge, Mass., US pp. 364–371, XP002067187.

Liskov, B: "Practical Uses of Synchronized Clocks in Istributed Systems" Distributed Computing, vol. 6, No. 4, Jul. 1, 1993, pp. 211–219, XP000382321.

*Primary Examiner*—Joseph E. Palys
*Assistant Examiner*—Rijue Mai
*Attorney, Agent, or Firm*—Miles & Stockbridge P.C.; Edward J. Kondracki

[57] ABSTRACT

The invention relates to a process for synchronizing a computer system with regard to a date which changes over time. The computer system comprises one or more modules (1, 2, 3, 4), each module (1, 2) comprising several processors (10, 11, 12, 13, 20, 21, 22, 23) regulated by a clock specific to a module (1, 2). Each processor (10, 11, 12, 13, 20, 21, 22, 23) comprises a private register TBR (16, 17, 18, 19, 26, 27, 28, 29) adapted to contain a value corresponding to said date and to undergo an incrementation by the clock specific to the module (1, 2) comprising this processor (10, 11, 12, 13, 20, 21, 22, 23). A processor (10) is selected as the master of the system so as to instruct each of the other processors (11, 12, 13, 20, 21, 22, 23) which function as a salve to place the master processor and to declare said master processor in a ready state which consists, for each slave processor (11, 12, 13, 20, 21, 22, 23), in waiting for an authorization from the master processor (10) of the system, without being able to be interrupted. Each processor (10, 11, 12, 13, 20, 21, 22, 23) possessing the said authorization, immediately reads the contents of a register TBC (50, 51) common to the processors (10, 11, 12, 13, 20, 21, 22, 23) of one and the same module (1, 2) and writes these contents to an associated register (16, 17, 18, 19, 26, 27, 28, 29) TBR without being able to be interrupted.

9 Claims, 3 Drawing Sheets

PROCESS FOR SYNCHRONIZING A COMPUTER SYSTEM AND COMPUTER SYSTEM THUS SYNCHRONIZED

BACKGROUND OF THE INVENTION

1. Field of the Invention

The field of the invention is that of the synchronizing of computer systems with regard to dates which change over time.

2. Description of Related Art

In a computer system, it is useful to be able to date various events involving the system. It is for example beneficial to know the date expressed in years, months, days, hours, minutes and seconds of creation or modification of a file. For certain events which trigger particular procedures, it is beneficial to pinpoint the date down to a millisecond, or even a microsecond or a portion of a microsecond.

To do this, the system must have at its disposal a reference date which changes over time through incrementation of its value, for example by means of a clock. It is useful to be able to initialize a value of this date at any moment. For example, when starting the system up, one may wish to take as the initial date that contained in a memory incremented by a backup battery, independent of an interruption in the power supply to the system. After starting the system up, one may wish to modify the current date so as to take account of various essentials such as, by way of non-limiting examples, an alteration of local time, a rescheduling, a clock drift, a loss of backup battery or a synchronization with a different system.

To accurately date certain events handled by a processor, it is beneficial for the processor to possess a current date value in a private register to which it has fast access. This value is hardware incremented by means of a clock which additionally regulates the sequencing of the processor.

According to the known state of the art, following a request to modify the current date value, the processor executes a sequence which consists essentially in adding a difference Δ, representative of the offset between the current date values before and after modification, to the current value contained in its private register. It is thus made certain that, regardless of the instant at which the processor modifies the date in its register, the new current value takes account of the changing of the date over time. In a system comprising several processors, it is possible to envisage each processor performing, successively or simultaneously, the aforenoted sequence. It should be observed that, in the case where all the processors are regulated on the basis of the same clock, if a second processor executes the sequence at an instant subsequent to that at which a first processor has executed it, the private registers of the two processors have been incremented by the same amount between these two instants and the values of the private registers of the two processors are identical after the last execution of the sequence. This observation remains valid for any number of processors.

In a system consisting of several modules, each module constituting a subsystem which comprises one or more processors, it is possible to dispatch to the modules a signal emanating from one and the same clock so as to regulate all the processors of the system in synchronism. For example, U.S. Pat. No. 5,305,453 describes a solution for setting the dispatched clock signal to an identical phase on reception thereof in each module. However, this requires identical technology of construction for all the modules: same operating frequency, same passband for the physical components, etc. Moreover, this also requires specialized physical link-ups between modules. Any replacement or any subsequent addition of a module in order to increase the performance of the system requires that the initial technology be retained or that special adaptations be made and often requires additional wiring.

Execution runs of sequences which consist in updating a date by adding the difference Δ to the contents of the private register of each processor, as mentioned above, raise a few problems in respect of dispensing with a clock reference which is physically common to all the modules of a computer system. This is because, in a system in which each module has at its disposal a specific clock reference, distinct from that of the other modules, if a processor of a second module adds the difference Δ at an instant t+dt after an instant t at which a processor of a first module adds the difference Δ, it is difficult to be certain that the private registers of the two processors have been incremented by the same amount between these two instants since distinct clocks do not necessarily have identical frequencies and phases. Even assuming that perfect synchronization is possible between the processors of all the modules of the system, so that all the execution runs of the sequence described take place at the same instant t, problems of the drifting of the date values between processors of various modules remain unresolved.

Problems of the drifting of the date values between two processors arise when the two processors are regulated by independent clock signals. If at an initial instant the private register of the first processor contains a date value identical to that contained in the private register of the second processor, the incrementing of the private registers by different clock signals causes a discrepancy between the two values which increases over time, resulting in a drifting of the date value of one processor relative to the other. By periodically placing a new date value in the private register of each processor, for example before the drift causes the date values to depart from a given accuracy range, date values which are identical in this accuracy range are obtained for the processors of all the modules. This makes it possible to synchronize the system with regard to a single date, considered in the given accuracy range. However, an addition of Δ as described above is not applicable, in particular because it is difficult to constrain the value of the drift between modules with precision.

SUMMARY OF THE INVENTION

The subject of the invention is a process for synchronizing a computer system with regard to a date which changes over time, said computer system comprising one or more modules, each module comprising several processors regulated by a clock specific to this module, each processor comprising a private register TBR designed to contain a value of said date and to undergo an incrementation by the clock specific to the module comprising this processor, characterized in that:

a processor is selected master of the system so as to instruct each of the other processors to place itself and to declare itself in a ready state which consists, for each processor, in waiting for an authorization from the master processor of the system, without being able to be interrupted;

each processor possessing said authorization, immediately performs a reading of the contents of a register TBC which is directly accessible to the processors of one and the same module, followed by a writing of these contents to its register TBR without being able to be interrupted, the contents of said register TBC and the contents of a register TBC which is directly accessible to the master processor being identical at the moment of said reading.

The subject of the invention is also a computer system comprising one or more modules, each module comprising several processors regulated by a clock specific to this module, each processor comprising a private register TBR designed to contain a date value and to undergo an incrementation by the clock specific to the module comprising this processor, characterized in that it comprises:

means for selecting a processor to be master of the system so as to instruct each of the other processors to place itself and to declare itself in a ready state which consists, for each processor, in waiting for an authorization from the master processor of the system, without being able to be interrupted;

in each module, a register TBC which is directly accessible to the processors of the module and is incremented by the clock specific to the module, designed to contain a date value identical to that of the register TBC of the module wherein the master processor is situated when the master processor sends said authorization.

BRIEF DESCRIPTION OF THE DRAWINGS

Other aspects and details of the embodiment of the process and of the system according to the invention will also be set out in the description which follows.

DESCRIPTION OF THE PREFERRED EMBODIMENTS

Figure 1:
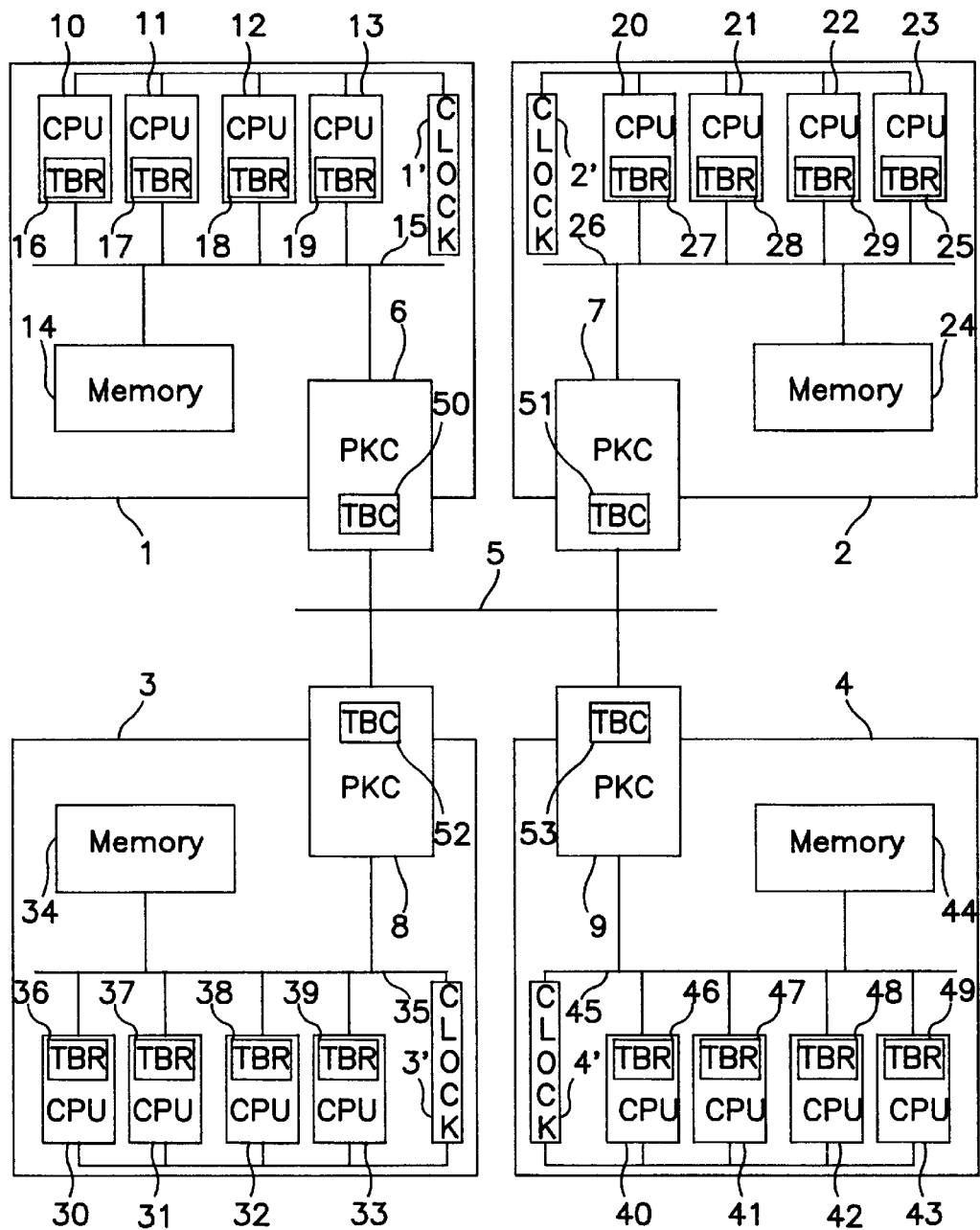
FIG. 1 represents a synchronous system according to the invention.

With reference to FIG. 1, a computer system comprises one or more modules 1, 2, 3, 4, although the number four is not limiting. The module 1 comprises several processors 10, 11, 12, 13 referred to as CPUs, regulated by a clock 1 specific to the module. Likewise, the module 2 comprises several processors 20, 21, 22, 23 referred to as CPUs, regulated by a clock 2 specific to the module 2; the module 3 comprises several processors 30, 31, 32, 33 referred to as CPUs, regulated by a clock 3 specific to the module 3 and the module 4 comprises several processors 40, 41, 42, 43 referred to as CPUs, regulated by a clock 4 specific to the module 4. The system is not limited to the use of four processors in each module and remains in accordance with the invention if a module comprises a number of processors other than four, for example two or six.

The memory of the system is shared among the modules by means of memory units 14, 24, 34, 44, each physically situated in the module 1, 2, 3, 4 respectively. Each processor has read and write access to all the memories 14, 24, 34, 44 by means of cache-memory consistency protocols such as those described in patent applications FR 9706747, FR 9706388 corresponding, respectively, to U.S. a Ser. Nos. 09/088,370; 09/082,938 or 09/083,154, or FR 9706387, filed in the name of Thierry Bordaz et al. and assigned to the present Applicant. The subject matter of each of said U.S. applications is hereby incorporated by reference.

As explained in the abovecited patent applications, the cache-memory consistency protocols are implemented by means of facilities referred to as PKCs, labeled 6, 7, 8 and 9 in FIG. 1. The facility 6 is situated physically in the module 1 and communicates locally with the processors 10 to 13 and with the memory 14 by means of a system bus 15. Likewise, the facility 7 is situated physically in the module 2 and communicates locally with the processors 20 to 23 and with the memory 24 by means of a system bus 25. The facility 8 is situated physically in the module 3 and communicates locally with the processors 30 to 33 and with the memory 34 by means of a system bus 35. The facility 9 is situated physically in the module 4 and communicates with the processors 40 to 43 and with the memory 44 by means of a system bus 45.

Moreover, the facilities 6 to 9 communicate amongst themselves remotely by means of a bus 5 exterior to the modules 1 to 4. The protocol for communication over the bus 5 is for example the known protocol SCI. The architecture described makes it possible to implement an operating system common to all the modules 1 to 4 and to any additional module whose PKC facility is connected to the bus 5.

Each CPU comprises a time base private register referred to as TBR, designed to contain a date value which changes over time. In the module 1, each register time base 16, 17, 18, 19, respectively allotted to the processor 10, 11, 12, 13, is designed to undergo an incrementation by the clock 1' specific to the module 1. For example, each private register TBR codes the date value on 64 bits, for which each increment corresponds to a clock pulse. If the clock of module 1 is at a frequency of 100 MHz, a clock pulse then represents 10 vs. A rapid calculation on the 64th power of 2 shows that a value of more than 5849 years can be coded in each register TBR with a spacing of 10 vs. At a frequency of 1 GHz, it is seen that it is possible to code a value of more than 584 years with a spacing of 1 vs. The contents of the register TBR therefore allow the processor to date the events which it is handling, over a large timespan with high resolution.

Moreover, each processor CPU can comprise one or more decrementation registers, not shown in the drawings, which cause an interrupt on reaching zero. By placing in a decrementation register, for example 32 bits loaded from the register TBR, it is possible to trigger an event at a precise date and thus to synchronize the system.

Likewise, in the module 2, each register 26, 27, 28, 29, respectively allotted to the processor 20, 21, 22, 23, is designed to undergo an incrementation by the clock 2' specific to the module 2. In the module 3, each register 36, 37, 38, 39, respectively allotted to the processor 30, 31, 32, 33, is designed to undergo an incrementation by the clock 3' specific to the module 3. In the module 4, each register 46, 47, 48, 49, respectively allotted to the processor 40, 41, 42, 43, is designed to undergo an incrementation by the clock 4' specific to the module 4.

The facility 6 comprises a register 50, referred to as a TBC, which is common to the processors 10, 11, 12, 13, in the sense that this register is accessible, at least in read mode, to these processors. The register 50 has an identical format to that of the registers TBR. The register 50 is designed to be incremented continually by the clock 1' specific to the module 1. The contents of the register 50 therefore change over time in line with the contents of the registers 16, 17, 18, 19.

Each of the facilities 7, 8, 9, respectively comprises a register TBC 51, 52, 53, identical to the register TBC 50, structurally and functionally in respect of each module 2, 3, 4, to which it belongs.

The contents of the TBC registers 50, 51, 52 and 53 are identical at any instant in a given accuracy range. To achieve this, any writing to a register TBC, other than the incrementation described earlier, causes this register TBC to be copied over into the other registers TBC in a hardware fashion, while taking account of the time required by a datum to travel from one PKC facility to another over the bus 5.

On initializing the system, a module is selected as time base master module. This module is referred to as TBMM. If the module TBMM is for example module 1, the configuration of the facility 6 allows the processors 10 to 13 to have write access to the register 50 so as to be able to place a date value therein. In this case, the registers 51, 52, 53, are write-accessible only from the bus 5 over which synchronizing packets travel so as to make the contents of the registers 51, 52, 53 consistent with the contents of the register 50.

As stated earlier, the architecture described makes it possible to implement an operating system which is common to all the modules 1 to 4 designated by way of non-limiting example. The operating system comprises a kernel consisting of various functions for managing system resources. An application is said to make a system call when it calls a function of the kernel. Of more particular interest here is a function named ksettimer, intended to synchronize the system, that is to say to provide a reference time base common to all the elements of the system. The function ksettimer can be called on system initialization, by an application which requests an alteration of reference date for the system, which date is expressed not only in years, months, days but also in hours, minutes, seconds with a resolution of the order of a nanosecond. The function ksettimer can also be called regularly in order to re-update the date so as to alleviate drifting between the various clocks of the system and with respect to universal time.

A call to the function ksettimer triggers a main procedure, execution of which begins in what is a priori any processor of the system, depending on an allocation of processors to the procedures, carried out by a scheduler and by a dispatcher, which are not represented since they are known to the person skilled in the art.

Figure 2:
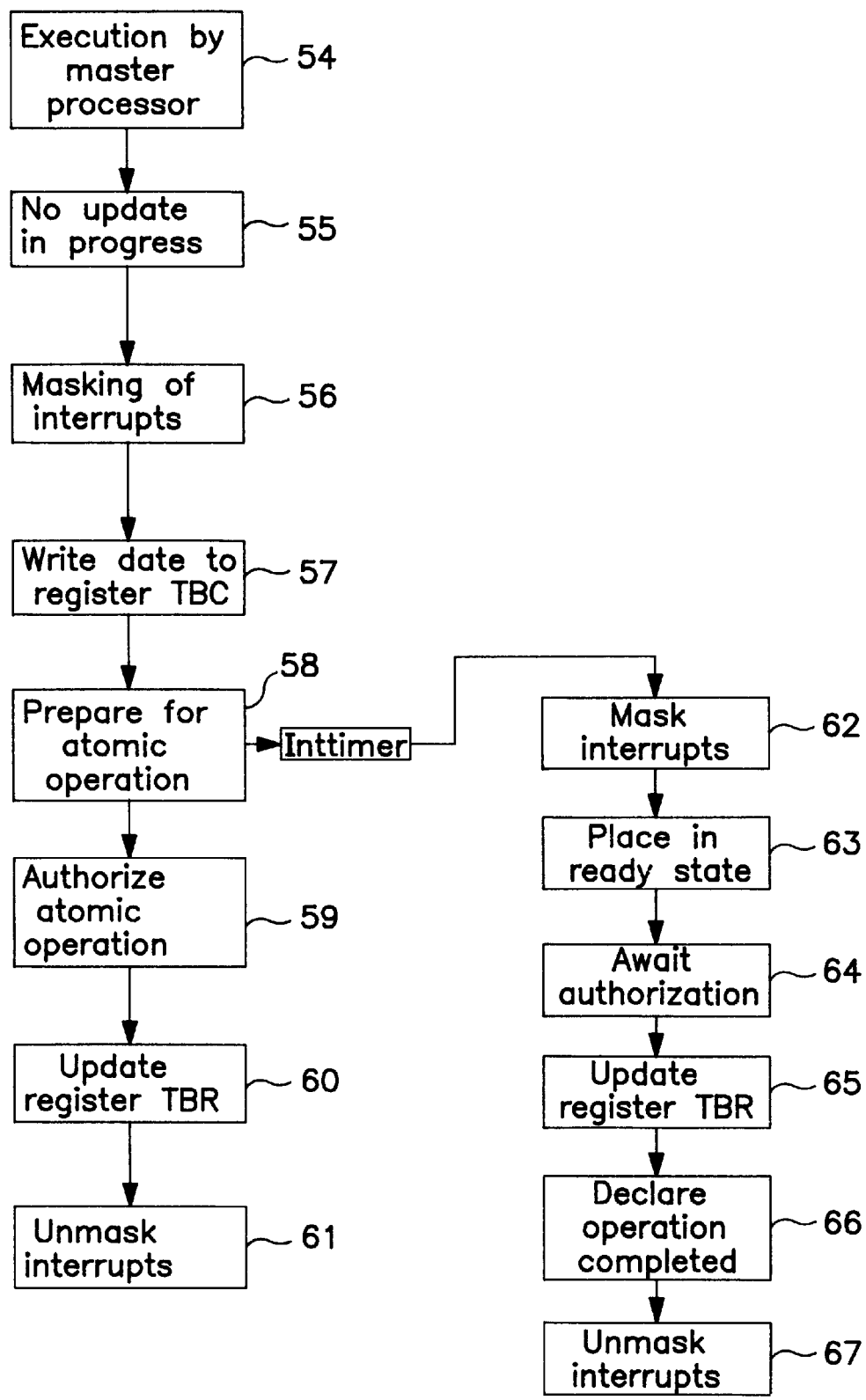
FIG. 2 represents process steps in a synchronous system in accordance to the invention.

With reference to FIG. 2, the main procedure commences with a step 54 which verifies whether the processor which is executing the procedure for updating the date is a processor of the module TBMM. If this is not the case, the procedure together with its context is transferred to the module TBMM where the dispatcher allots a processor of the module TBMM, then selected master of the system. Let us consider for example, in the remainder of the description, the case in which the module TBMM is the module 1 with the processor 10 selected to operate as the master. The master processor then executes a succession of steps 55 to 61.

Step 55 verifies that all updating of any previous date has been completed. To do this, an infinite loop scans through an array, each row of which allotted to a processor of the system contains a variable named time_updates which, set to a first value, signals that the processor to which the row is allotted is not about to update its register TBR. All the time_updates variables of the array are then set to a second value so as to signal that an update of the date is in progress.

In step 56 all the interrupts with regard to the master processor are masked, so as to define a critical section with regard to the master processor, between step 56 and step 61 in which the interrupts with regard to the master processor are unmasked.

In step 57, the master processor writes the date value received during the call to the function ksettimer, to the register TBC of its module. In the case where the master processor is the processor 10, the date value is written to the register 50. The date value is then propagated from the register 50 to the registers 51, 52, 53, by the protocol for communication over the bus 5, as described earlier. If need be, before writing the date value to the register 50, the processor 10 has converted this value into a format compatible with that of the register 50. Each of the registers 50, 51, 52, 53 continues to be incremented by the clock of each of the modules 1, 2, 3, 4 respectively.

Step 58 consists essentially in preparing for an atomic operation which will be executed by each of the other processors, hence referred to as slave processors. The master processor sets a variable named gotime to a first value to indicate that the atomic operation is not authorized. The master processor then sends an interrupt named inttimer to all the other processors. Reception of the interrupt inttimer in each slave processor triggers therein execution of an auxiliary procedure essentially comprising steps 62 to 67 described below.

The purpose of step 59 is to give the slave processors authorization to execute the atomic operation. Let us recall that during an atomic operation the processor which executes it does not branch to any internal instruction other than those of the operation until the operation is completed. In step 59, the master processor first executes a wait loop in which it reads a logical variable named pcpu_ready, and exits the loop when all the bits of the variable pcpu_ready are in a true state, signifying that all the slave processors are ready to execute the atomic operation. On exiting the wait loop, the master processor sets a variable named gotime into a true state, signifying authorization to execute the atomic operation.

In step 60, the master processor executes the atomic operation which consists essentially in loading the value contained in the register TBC of its module and in placing this value in its register TBR, performing suitable formatting conversions of the register TBR if necessary. For example, the processor 10 loads the value contained in the register 50 and places it in the register 16.

In step 61, the master processor sets the variable named time_updates of the row of the array which is allotted to it to the first value, signaling that the master processor is not about to update its register TBR. The master processor then reverts to the priority level which existed before the triggering of step 56.

Step 62 is triggered in each slave processor on receipt of the interrupt inttimer. Each slave processor naturally saves the context of any currently executing procedure and masks all the interrupts which are relevant to it, so as to define a critical section with regard to the slave processor, between step 62 and step 67 where the interrupts with regard to the slave processor are unmasked.

In step 63, the slave processor sets, in the logical variable named pcpu_ready, the bit which corresponds to it, to a true state, signifying that the slave processor is ready to execute the atomic operation.

In step 64, the slave processor executes a wait loop in which it reads the logical variable named gotime and exits the loop when the logical variable gotime is true. Since in each slave processor the procedure sequences are identical, each slave processor of one and the same module reads the switching of the variable gotime to the true state at the same instant on its local bus. For example, the processors 20 to 23 read the state of the variable gotime on the bus 25 at the same instant. Likewise, the processors 30 to 33 read the state of the variable gotime on the bus 35 at the same instant, and the processors 40 to 43 read the state of the variable gotime on the bus 45 at the same instant. Similarly, the processors 16 to 19 read the state of the variable gotime on the bus 15 at the same instant. This is aided in particular by implementing a cache-memory consistency protocol such as that described the aforenoted in patent applications Ser. Nos. 09/088,370; 09/082,938 or 09/083,154, incorporated herein by reference. Thus, all the processors of one and the same module go simultaneously to step 65.

In step 65, each slave processor executes the atomic operation which consists essentially in loading the value contained in the register TBC of its module and in placing this value in its register TBR, performing suitable formatting conversions of the register TBR if necessary. For example, each of the processors 20 to 23 loads the value contained in the register 51 and places it respectively in the register 26, 27, 28, 29 at the same instant t2. Likewise, each of the processors 30 to 33 loads the value contained in the register 52 and places it respectively in the register 36, 37, 38, 39 at the same instant t3 and each of the processors 40 to 43 loads the value contained in the register 53 and places it respectively in the register 46, 47, 48, 49 at the same instant t4. Similarly, each of the processors 10 to 13 loads the value contained in the register 50 and places it respectively in the register 16, 17, 18, 19 at the same instant t1. It matters little whether the instants t1 to t4 are different, for example on account of latencies in the inter-module cache-memory consistency protocol, since in fact the contents of the registers 50 to 53 are kept temporally consistent at any instant by the protocol for communication over the bus 5 and the continual incrementation by the respective clock of each module. Thus, the contents of all the registers TBR are synchronous.

In step 66, the slave processor sets the variable named time_updates of the row of the array which is allotted to it to the first value, signaling that the slave processor is not about to update its register TBR and declares that the operation has been completed but for step 67.

In step 67, the slave processor then reverts to the priority level which existed before the triggering of step 62.

In the exemplary implementation depicted, it is observed that step 57 precedes step 58. In fact, the order of steps 57 and 58 is not fundamental to the implementation of the invention. However, step 58 generates a critical section in each slave processor, defined over the time interval which separates step 62 from step 67. The shorter this critical section, the better is the performance of the system in terms of speed. However, this critical section is conditioned in step 64 by step 59. An additional advantage is therefore obtained by having step 57 precede step 58, so as to reduce the time interval which separates step 58 from step 59. This is possible in particular when no updating of the register TBRs is performed outside of steps 60 and 65.

Figure 3:
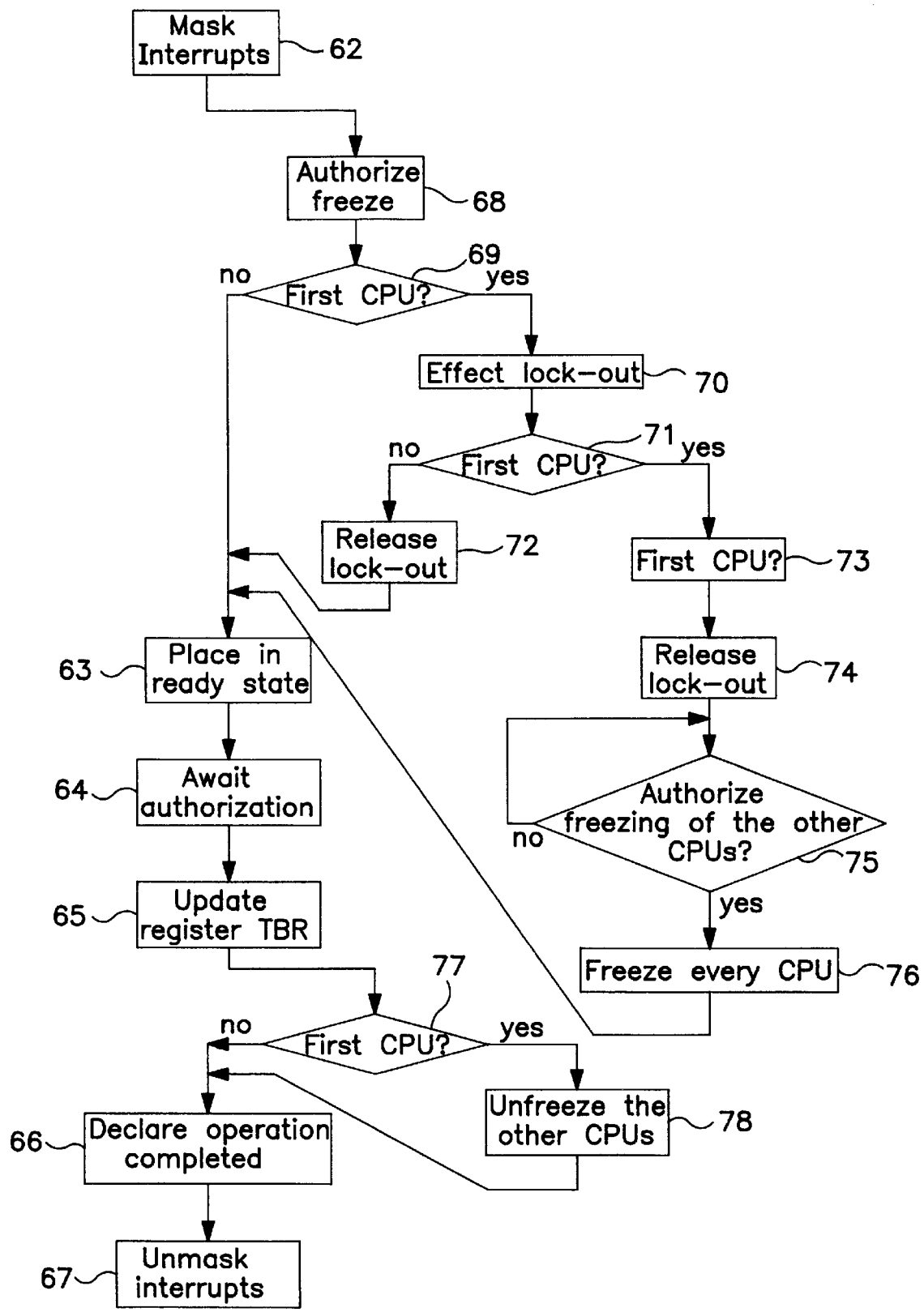
FIG. 3 represents a variant of the process steps of FIG. 2 in accordance with the invention.

FIG. 3 depicts an alternative implementation of the invention in a case in which it is preferable to freeze the contents of the registers TBR so as to place a new value therein. Additional steps 68 to 78 are then interposed between steps 62 to 67. The purpose of steps 68 to 78 is to allow one and only one processor of each module to freeze the contents of the register TBR of all the processors of the same module during the updating of the register TBR in step 65. The freezing of the register TBR consists in disabling its incrementation by the clock specific to the module, unfreezing consisting in enabling its incrementation by the clock specific to the module. The disabling and enabling of incrementation is carried out by circuits internal to the processor with the aid of specialized instructions on which it is not necessary to dwell within the framework of the description.

In step 68, the slave processor gives authorization to freeze its register TBR by incrementing for example a variable named begin_mynode[node_id].

Steps 69 to 74 make it possible to nominate one and only one processor as first processor of each module so as to freeze the register TBR of each processor of the module.

In step 69, the slave processor looks to see whether it is the first slave processor of the module to execute the procedure. To do this, it reads a variable named for example freeze_my_node[node_id], specific to each module referenced by an identifier named node_id, and a first state of which signifies that no other processor of the module has entered step 69 while this variable is being read. However, it should be borne in mind that the procedures execute in parallel on each processor and that, consequently, there remains an indeterminateness with regard to nomination as first processor if several processors of one and the same module simultaneously access the variable freeze_my_node[node_id]. Therefore, if the variable freeze_my_node[node_id] is in the first state, the processor executes steps 70 and 71. If the variable freeze_my_node[node_id] is in a second state which signifies that another processor has already obtained nomination as first processor of the module, the processor branches directly to step 63.

In step 70, the processor effects a lock-out specific to the module which, as is known in procedures executed in parallel, can only be released by a single processor at a given instant. If the lock-out has already been effected, the processor continues waiting at step 70 until the lock-out is released. When the lock-out is released, the processor goes to step 71. It is thus certain that at most one processor is executed in step 71 at a given instant, and then the following steps until the lock-out is released.

In step 71, the processor is alone in reading the variable freeze_my_node[node_id]. If the variable freeze_my_node[node_id] is in the first state, the processor branches to step 73. In step 73, the processor takes on the nomination of first processor, setting the variable freeze_my_node[node_id] into the second state, and then releases the lock-out in step 74. If the variable freeze_my_node[node_id] is not in the first state, this means that some other processor has freed the lock-out before it so as to place the variable freeze_my_node[node_id] in the second state, and the processor then branches to step 72 in which it releases the lock-out.

Step 72 is followed by step 63 as described earlier.

Step 74 is followed by step 75 executed only by the first processor on account of the conditional branching at step 71. In step 75, the first processor of each module places itself in a freeze authorization wait loop relating to all the processors CPU of the module. To do this, the first processor of the module continually reads the variable named begin_mynode[node_id]. As soon as the value of the variable named begin_mynode[node_id] corresponds to the number of processors in the module, the processor branches to step 76.

In step 76, the first processor of the module freezes the register TBR of all the processors of the module and then branches to step 63.

The sequencing of steps 63 to 65 is identical to that explained with reference to FIG. 2. However, with reference to FIG. 3, step 77 follows step 65 so as to verify whether the processor has gone through steps 73 to 76 before going through step 65, that is to say whether the processor is the first processor of the module. If this is not the case, the processor branches directly to step 66. If the processor is the first processor of the module, it branches to step 78.

In step 78, the first processor unfreezes the register TBR of all the processors of the module and then branches to step 66.

Steps 66 and 67 follow in a manner identical to that described with reference to FIG. 2.

While the preferred forms and embodiments of the invention have been illustrated and described, it will be apparent to those of ordinary skill in the art that various changes and modifications may be made without deviating from the inventive concept and spirit of the invention as set forth above, and it is intended by the appended claims to define all such concepts which come within the full scope and true spirit of the invention.

What is claimed is:

1. A process for synchronizing a computer system with regard to a date which changes over time, said computer system comprising one or more modules (1, 2, 3, 4), each module (1, 2) comprising several processors (10, 11, 12, 13, 20, 21, 22, 23) regulated by a clock (1', 2') specific to said module (1, 2), each processor (10, 11, 12, 13, 20, 21, 22, 23) comprising a private register TBR (16, 17, 18, 19, 26, 27, 28, 29) adapted to contain a value corresponding to said date and to undergo an incrementation by the clock (1', 2') specific to the module (1, 2) comprising said processor (10, 11, 12, 13, 20, 21, 22, 23), characterized in that it comprises the following steps:

selecting a processor (10) to function as a master processor of the system, instructing each of the other processors (11, 12, 13, 20, 21, 22, 23) to place said other processors which function as slaves to declare said other processors in a ready state which consists, for each processor (11, 12, 13, 20, 21, 22, 23), in waiting for an authorization from the master processor (10) of the system, without being able to be interrupted;

immediately reading the contents of a register TBE (50, 51) common to all processors 10–17, 20–23) of one and the same module (1, 2) by each processor (10, 11, 12, 13, 20, 21, 22, 23) receiving said authorization from the master processor, and writing the contents read in the private register TBR (16, 17, 18, 19, 26, 27, 28, 29) private register without interruption.

2. A process for synchronizing a computer system with regard to a date which changes over time, said computer system comprising one or more modules (1, 2, 3, 4), each module (1, 2) comprising several processors (10, 11, 12, 13, 20, 21, 22, 23) regulated by a clock (1', 2') specific to said module (1, 2), each processor (10, 11, 12, 13, 20, 21, 22, 23) comprising a private register TBR (16, 17, 18, 19, 26, 27, 28, 29) adapted to contain a value corresponding to said date and to undergo an incrementation by the clock (1', 2') specific to the module (1, 2) comprising said processor (10, 11, 12, 13, 20, 21, 22, 23), characterized in that it comprises the following steps:

selecting a processor (10) to function as a (54) master processor of the system so as to instruct (58) each of the other processors (11, 12, 13, 20, 21, 22, 23), so-called slaves, to place and to declare said other processors in a ready state (63) for executing an atomic operation;

signalling an authorization (59) by the master processor (10) to execute said atomic operation;

instructing each processor (10, 11, 12, 13, 20, 21, 22, 23) of the state (58, 63) of said authorization, and immediately executing (60, 65) said atomic operation.

3. A process for synchronizing a computer system according to claim 2, characterized in that said atomic operation consists essentially in:

loading a value whose unit is a multiple of the period of the clock specific to the module, contained in a register TBC (50, 51) common to the processors (10, 11, 12, 13, 20, 21, 22, 23) of the module (1, 2) and continually incremented by the clock (1', 2') specific to the module (1, 2), placing this value in the private register TBR (16, 17, 18, 19, 26, 27, 28, 29) of the processor (10, 11, 12, 13, 20, 21, 22, 23) executing said atomic operation.

4. A process for synchronizing a computer system according to claim 1, characterized in that, before instructing (58) each of the other processors (11, 12, 13, 20, 21, 22, 23) to place said other processors and to declare said other processors in a ready state (63) for executing an atomic operation, and writing (57) a date value to the register TBC (50) of the master module (1) specific to the master module.

5. A process for synchronizing a computer system according to claim 4, characterized in that, before writing (57) a date value to the register TBC (50) of the master module (1), the master processor (10) places itself (56) in an uninterruptible state.

6. A process for synchronizing a computer system according to claim 5, characterized in that each slave processor (11, 12, 13, 20, 21, 22, 23) places itself (62) in an uninterruptible state before placing itself in a ready state (63).

7. A process for synchronizing a computer system according to claim 6, characterized in that, after having placed itself (62) in an uninterruptible state, each processor (10, 11, 12, 13, 20, 21, 22, 23) signals an authorization (68) to freeze its register TBR (16, 17, 18, 19, 26, 27, 28, 29).

8. A process for synchronizing a computer system according to claim 7, characterized in that in each module (1, 2), a processor (11, 20) is nominated first processor for freezing the private register TBR (16, 17, 18, 19, 26, 27, 28, 29) of each of the processors (10, 11, 12, 13, 20, 21, 22, 23) by means of two successive tests on the same indicator, which tests are separated by a lock-out specific to each module.

9. A computer system comprising one or more modules (1, 2), each module (1, 2) comprising several processors (10, 11, 12, 13, 20, 21, 22, 23) regulated by a clock (1', 2') specific to said module (1, 2), each processor (10, 11, 12, 13, 20, 21, 22, 23) comprising a private register TBR (16, 17, 18, 19, 26, 27, 28, 29) adapted to contain a date value and to undergo an incrementation by the clock specific to the module (1, 2) comprising said several processors (10, 11, 12, 13, 20, 21, 22, 23), characterized in that it comprises:

means for selecting a processor (10) to be master of the system and instructing each of the other processors (11, 12, 13, 20, 21, 22, 23) to place and to declare said other processors in a ready state which consists, for each said other processor (11, 12, 13, 20, 21, 22, 23), in waiting for an authorization from the master processor (10) of the system, without being able to be interrupted, and in each module (1, 2), a register TBC (50, 51) directly accessible to the several processors (10, 11, 12, 13, 20, 21, 22, 23) of the module (1, 2) and means for incrementing a register TBC (50, 51) by the clock (1', 2') specific to the module (1, 2), containing a date value identical to that of the register TBC (50) of the module (1) wherein the master processor (10) is situated when the master processor (10) sends said authorization.

\* \* \* \* \*

UNITED STATES PATENT AND TRADEMARK OFFICE
CERTIFICATE OF CORRECTION

PATENT NO. : 6,073,247
DATED : June 6, 2000
INVENTOR(S) : Boutet, et al.

It is certified that error appears in the above-identified patent and that said Letters Patent is hereby corrected as shown below:

In the Abstract :

Line 15, change "salve" to "slave".

Page 6, line 20, the phase "abovecited" should be changed to "above cited".

In the Claim:

claim 1, line 24, delete "TBE", then insert -- TBC--.

Claim 1, line 29, before "private register", insert --to the --.

Signed and Sealed this

Eighth Day of May, 2001

*Attest:*

NICHOLAS P. GODICI

*Attesting Officer*     *Acting Director of the United States Patent and Trademark Office*